March 12, 1968     L. L. FRENCH     3,372,549
REMOTE-CONTROLLED AUTOMATICALLY OPERATING IRRIGATION GATES
Filed July 18, 1966
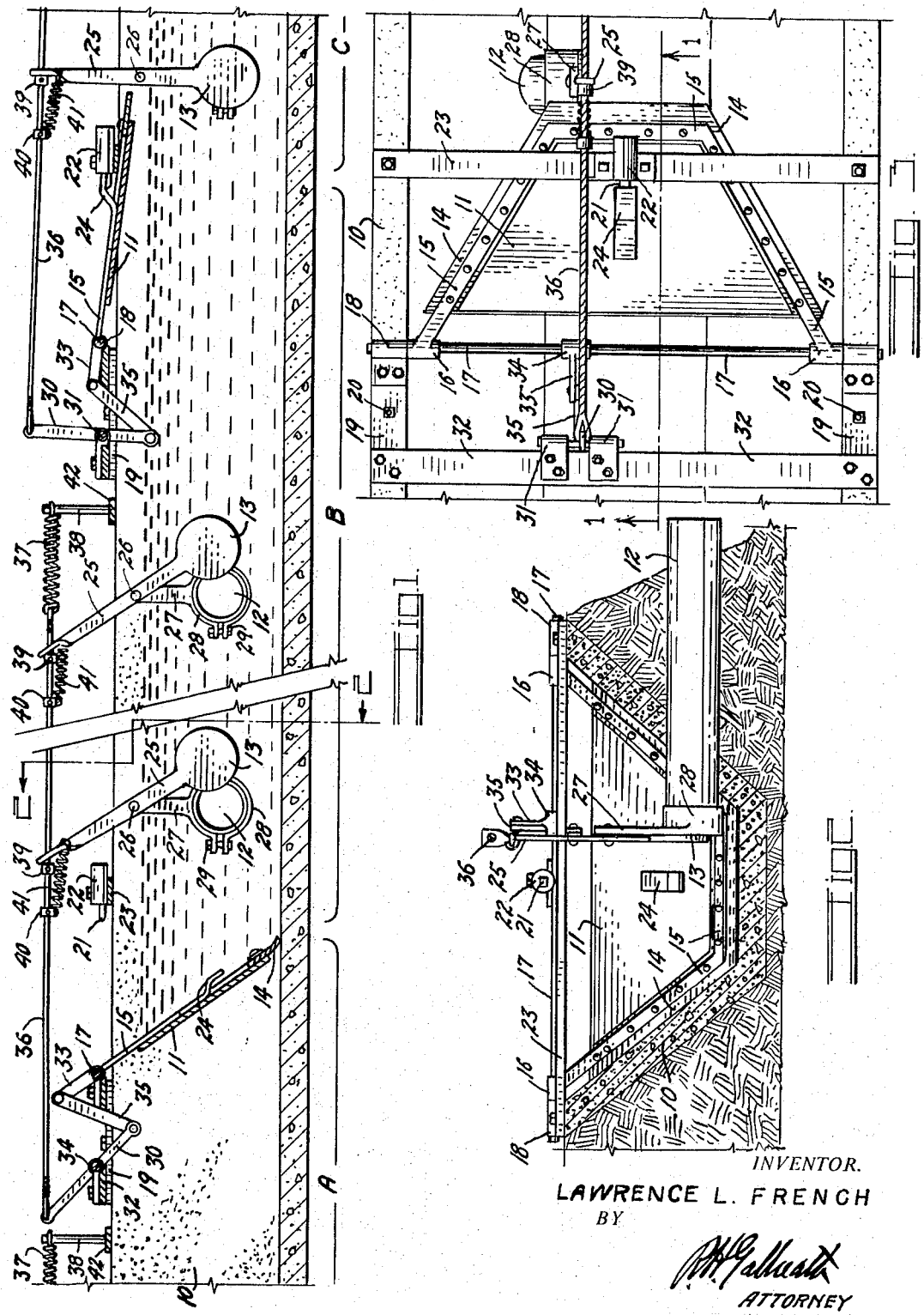
INVENTOR.
LAWRENCE L. FRENCH
BY
ATTORNEY

United States Patent Office 3,372,549
Patented Mar. 12, 1968

3,372,549
REMOTE-CONTROLLED AUTOMATICALLY
OPERATING IRRIGATION GATES
Lawrence L. French, Star Rte., Box 248,
Powell, Wyo. 82435
Filed July 18, 1966, Ser. No. 565,926
6 Claims. (Cl. 61—24)

ABSTRACT OF THE DISCLOSURE

A plurality of main gates positioned at spaced intervals along a main ditch, dividing the latter into sections; a plurality of lateral gates in each section discharging water from their respective section; the main gate of each section being connected with the lateral gates of that section so that the latter will be moved in correspondence with the main gate of that section.

---

This invention relates to field irrigation and more particularly to means for remotely and automatically distributing water from a main ditch to a plurality of spaced lateral row ditches covering the field to be irrigated.

Customarily, the water from the main ditch is distributed to the row ditches by hand manipulation of lateral gates or lateral siphons. The principal object of this invention is to longitudinally divide a main ditch provided with lateral gates into a plurality of sections by means of main gates and provide means which will sequentially close the main gates and open the lateral gates of the sections so that the water will be distributed from the main ditch section-at-a-time as the irrigation proceeds.

Another object of this invention is to provide remotely-controlled means for opening the main gates and to provide automatic means for opening the lateral gates of each section in consequence of the closing of the main gate from that section to the preceding section.

A further object is to so construct the main gates and their operating mechanisms so that they may be readily installed at any chosen positions and spacings along the main ditch to suit conditions encountered in various fields and to provide means for individually preadjusting the degree of opening of the lateral gates to suit the demands of each lateral ditch.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a fragmentary longitudinal section through a main ditch, taken on the line 1—1, FIG. 3, showing the invention in place thereon;

FIG. 2 is a cross-section taken on the line 2—2, FIG. 1; and

FIG. 3 is a top plan view looking downwardly on a portion of FIG. 1.

The invention is more particularly designed for use in a preshaped main ditch lined with asphalt or formed from concrete to provide a relatively flat bottom from which flat, outwardly inclined sidewalls arise such as illustrated at 10 on the accompanying drawing. The main ditch is closed at its far extremity and open to a source of water at its near extremity.

Briefly, the invention provides a plurality of swinging main gates 11 positioned at spaced intervals along the main ditch 10 to divide the latter into sections such as indicated at A, B and C in FIG. 1 from each of which a plurality of lateral outlet pipes 12 discharge water through the wall of the main ditch to spaced row ditches in the field. The lateral outlet pipes are provided with swinging lateral gates 13. Initially, the main gates 11 are open and the lateral gates 13 are closed and the main ditch is filled with water. The main gates 11 are then closed in timed sequence beginning with the most distant gate. As each main gate closes it will close off the preceding section and automatically open the lateral gates of the next succeeding section to allow water to independently discharge from each section in sequence throughout the entire reverse length of the main ditch.

The main gates 11 are similar in construction and each comprises a plate shaped to substantially conform to the cross-sectional shape of the main ditch and provided with a flexible sealing edge 14, to seal against the inner wall of the ditch. The sealing edge 14 is secured to the plate by means of a metallic strap 15 which is preferably riveted to the plate and extends thereabove at its extremities to a fixed connection 16 with a rotatable hinge rod 17. The hinge rod 17 is journalled at its extremities in suitable bearings 18 mounted on bearing plates 19 secured to the walls of the ditch 10 in any desired manner such as by means of expansion bolts 20. Thus, the rod 17 rotates in consequence of the swinging movements of the main gate 11. Each gate can be supported in a substantially horizontal, open position, as shown at the right on FIG. 1, by means of latch bolt 21, actuated by a conventional solenoid 22 supported by a cross bar 23 extending across the ditch 10 and positioned to be engaged by a keeper 24 on the gate.

The lateral gates 13 are similar in construction and each comprises a preferably circular plate of relatively larger diameter than the outlet pipes 12 mounted or formed on the lower extremity of swinging arm 25 which is pivoted, intermediate its extremities, upon a pivot bolt 26 carried in the upper extremity of a pivot post 27. The pivot post 27 arises from a pipe clamp 28 which is clamped about the intake extremity of one of the lateral pipes 12 such as by means of a clamp bolt 29. Thus, when the arm 25 swings to a vertical position the circular plate will swing over and close the intake extremity of the pipe 12.

The lateral gates 12 of each section are caused to simultaneously swing open when the main gate of that section swings closed by means of an intermediately pivoted lever 30 journalled in suitable bearings 31 upon a second crossbar 32 secured to and extending between the bearing plates 19 parallel to the hinge rod 17. The lower extremity of the lever 30 is connected to the upper extremity of an operating arm 33 fixedly mounted on the adjacent hinge rod 17, as indicated at 34, by means of a connecting link 35, as shown in FIG. 1. Thus, as the gate 11 swings downwardly the upper extremity of the lever 30 will swing rearwardly.

The rearward swing of the lever 30 at each section is employed to open the lateral gates of that section through the medium of a tension cable 36 connected at its rear extremity to the upper extremity of the lever 30 and extending forwardly through the upper extremities of the swinging arms 13 of that section to a tension spring 37 connected to any fixed anchor member 38 which may be mounted on a cross bar 38. At each lateral gate an adjustable contact sleeve 39, of any conventional type, is affixed to the cable 36 to contact the adjacent swinging arm 25 as the cable moves in consequence of the closure of the main gate 11 of the section. Since, due to field conditions, all of the row ditches will not require the same amount of water, the volume of flow through each outlet pipe 12 can be preadjusted by preadjusting the position of the contact sleeve on the cable 36. A spring attachment sleeve 40 is attached to the cable rearwardly of the contact sleeve 39 and a tension spring 41 is tensioned to the swinging arm 25 to maintain the latter in resilient contact with the stop sleeve 39 at any preadjusted position of the latter.

Thus, as a main gate swings downwardly to close off a section of the main ditch, the lateral gates of the next succeeding section will be automatically opened through the medium of the tension cable 36 connected to that particular main gate. The solenoids 22 can be electrically interconnected by anyone skilled in the art so that they may be energized in any desired manner. It is preferred that the connections be made so that as each main gate closes, it will close a circuit, including a conventional time clock, to the next succeeding solenoid so that each section will distribute water for a preset interval before the next succeeding solenoid will be actuated close off that section and distribute water from the next succeeding section.

It is believed the operation of the invention will be understood from the above. Briefly, let us assume the main ditch is being maintained full from a supply source and that the lateral outlet pipes of a distant section, such as the section A, are distributing water. After a preset time interval the main gate 11 of the section B will drop closing off the supply to section A and opening the lateral pipes of section B, as illustrated in FIG. 1. After a second preset time interval the main gate 11 of section C will drop and close off the supply to section B and open the lateral gates of section C. This procedure will continue successively in a direction toward the supply source until all sections have been closed off and all of the lateral pipes have been fed. The supply source can then be closed off to allow the main gates to be preset in the original open position, awaiting the next desired irrigation period from that particular main ditch. The number of lateral outlet pipes in each section and the number of sections along the main ditch depends both upon the field conditions encountered and the amount of water flow available.

Since the connecting links 35 always operate in tension, they can comprise flexible lengths of chain and can be sufficiently long to allow the main gates to drop by gravity into the flowing water before the gates are required to exert tension on the tension cables 36.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. Means for distributing irrigation water from a main ditch to a plurality of lateral outlet pipes discharging through the wall of said main ditch comprising:
    (a) pivotally suspended and spaced-apart main gates dividing said main ditch into a series of sections;
    (b) a lateral gate pivoted to swing across and close the intake extremity of each outlet pipe;
    (c) an operating lever connected to each main gate so as to unitarily move therewith as said main gate is swung about its pivot to open and close said main ditch; and
    (d) a tension element extending from the operating lever of the main gate of each section to the lateral gates of that section so that the latter will be moved in correspondence to the movements of the main gate of that section for opening the outlet pipes of each section in consequence of the closing of the main gate of that section.

2. Means for distributing irrigation water as described in claim 1 in which the means for opening the outlet pipes comprises:
    (a) a rotatable hinge rod extending laterally of said main ditch above each main gate, each main gate being fixedly attached to and suspended from the hinge rod thereabove;
    (b) a swinging arm intermediately pivoted above the intake extremity of each of said outlet pipes;
    (c) a lateral gate plate carried by the lower extremity of each operating arm to the lower extremity of the adjacent intermediate lever so that the latter lever will be swung in a direction opposite to the direction of swing of the operating arm; and
    (d) an operating arm secured to and extending upwardly from each of said hinge rods;
    (e) a tension element extending between and contacting the upper extremities of the swinging arms of each section; and
    (f) means for transmitting the swinging movements of the operating arm of each section to the tension element of that section so as to move said swinging arms simultaneously with the movements of the main gate of that section.

3. Means for distributing irrigation water as described in claim 2 in which the means for transmitting comprises:
    (a) an intermediate lever mounted adjacent to and pivoted to swing in a plane parallel to each operating arm;
    (b) a connecting link connecting the upper extremity of each operating arm to the lower extremity of the adjacent intermediate lever so that the latter lever will be swung in a direction opposite to the direction of swing of the operating arm; and
    (c) means for connecting one extremity of the tension element to the upper extremity of said intermediate lever for transmitting movement to said tension element.

4. Means for distributing irrigation water as described in claim 3 having resilient means connected with the other extremity of said tension element for maintaining tension in the latter.

5. Means for distributing irrigation water as described in claim 4 having a contact element mounted on said tension element adjacent each swinging arm so as to contact and move the latter when the tension member moves in one direction.

6. Means for distributing irrigation water as described in claim 5 having resilient means maintaining each swinging arm in contact with its respective contact member.

References Cited

UNITED STATES PATENTS

| | | | |
|---|---|---|---|
| 519,981 | 5/1894 | Baggs | 61—24 |
| 1,086,315 | 2/1914 | Davis | 49—49 |
| 572,842 | 12/1896 | Towne | 61—12 |
| 2,362,747 | 11/1944 | Duke | 61—12 |
| 3,114,243 | 12/1963 | Winters | 61—12 |
| 3,300,985 | 1/1967 | Humphrys | 61—25 |

REINOLDA P. MACHADO, *Primary Examiner.*